United States Patent
Chessell et al.

(10) Patent No.: US 6,466,965 B1
(45) Date of Patent: Oct. 15, 2002

(54) CENTRALIZED AFFINITY MAINTENANCE IN A WORKLOAD MANAGED CLIENT/SERVER DATA PROCESSING SYSTEM

(75) Inventors: Amanda Elizabeth Chessell, Alton; Stephen James Cocks, Chandlers Ford; Katheryn Sarah Warr, Winchester, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,436

(22) Filed: Jul. 29, 1999

(30) Foreign Application Priority Data

Apr. 15, 1999 (GB) ............................................. 9908477

(51) Int. Cl.⁷ .............................................. G06F 15/16
(52) U.S. Cl. ...................................... 709/203; 709/101
(58) Field of Search ................................. 709/203, 219, 709/101, 201

(56) References Cited

U.S. PATENT DOCUMENTS

| | | | |
|---|---|---|---|
| 5,506,987 A | * 4/1996 | Abramson et al. | 709/103 |
| 5,872,972 A | * 2/1999 | Boland et al. | 709/102 |
| 5,925,098 A | * 7/1999 | Freund et al. | 709/203 |
| 5,987,502 A | * 11/1999 | Banks et al. | 709/203 |
| 5,995,997 A | * 11/1999 | Horvitz | 709/102 |
| 6,078,944 A | * 6/2000 | Enko et al. | 709/105 |

FOREIGN PATENT DOCUMENTS

| | | |
|---|---|---|
| EP | 0471442 | 2/1992 |
| EP | 0677943 | 10/1995 |
| EP | 849 921 | 6/1998 |

\* cited by examiner

Primary Examiner—Dung C. Dinh
Assistant Examiner—Kimberly Flynn
(74) Attorney, Agent, or Firm—Jeanine S. Ray-Yarletts

(57) ABSTRACT

In a client/server data processing system where a client sends a work request to a server which includes a group of workload managed server data processing processes each of which is capable of performing the work request, a server data processing apparatus running a server data processing process, the apparatus has: a data storage unit storing mapping data which maps a particular server data processing process to each of a plurality of groups of workload managed server data processing processes; a means for receiving from a client a request for the identity of the mapped server data processing process corresponding to a particular group of workload managed server data processing processes, the particular group being specified in the request; a means for accessing the data storage unit to determine, for the particular group specified in the received request, the identity of the mapped server data processing process; and a means for returning the identity of the mapped server data processing process to the client; wherein the request received from the client is associated with an entity whose lifetime is coupled to the lifetime of the server data processing process.

11 Claims, 4 Drawing Sheets

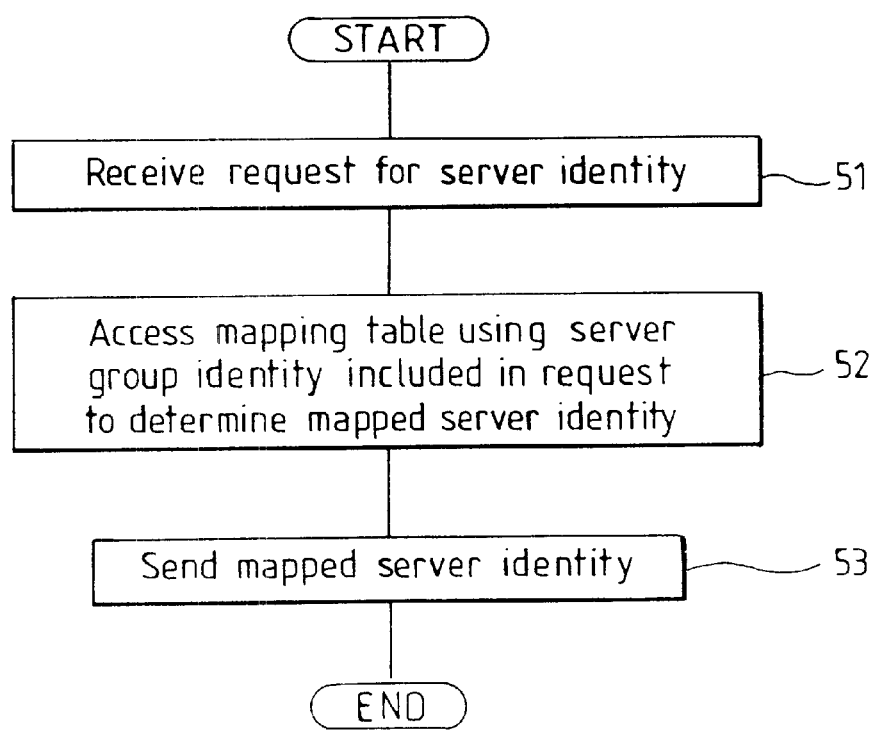

CENTRALIZED AFFINITY MAINTENANCE IN A WORKLOAD MANAGED CLIENT/SERVER DATA PROCESSING SYSTEM

FIELD OF THE INVENTION

The present invention relates to the field of data processing, and more particularly where a group of server data processing systems are being workload managed with respect to work requests originating from a client data processing system.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

In client/server data processing, a client directs a unit of work request to a particular server, which the client knows to have the capability of carrying out the unit of work on behalf of the client. Of course, a server can also function as a client, so inter-server requests are also common. In situations where a particular server is expected to have a large number of requests directed thereto, and also in situations where it is imperative that the server be always operational, it is very common to provide a group of servers, each of which is capable of carrying out certain units of work. For a particular unit of work being directed to the server group, a workload management unit makes a decision as to which particular member of the server group this particular unit of work request should be assigned. For example, the least busiest server in the group is chosen, or if one server in the group is experiencing a malfunction, another server in the group will be chosen to handle the request.

In the following description, the originator of a unit of work request that is attempting to access the server group will be referred to as an "entity". In one case, an entity could be a client. In another case (which is the more common case) an entity is a transaction, and thus in this case the type of data processing that is taking place is called transaction processing.

If an entity that is accessing a server group accesses the same server group again at a later time, it is highly advantageous for this later access to return to the same server in the group that was used during the previous access. This ensures that data integrity is maintained and also improves performance. This is known in the art as "affinity" (i.e., all work on behalf of a particular entity is processed on the same server for a particular server group).

One prior art way to establish such affinity (taking the common example of where the entity is a transaction) is to place a mapping list of transactions to servers within each server group. When a request arrives at the server group, the request is checked to determine if it is part of a transaction, and if it is, the mapping list is checked by the server group workload manager to determine if the transaction is on the mapping list and, if it is on the list, to which server in the group the mapping list maps the transaction. The workload manager then sends the request to this particular server, thus maintaining transaction affinity, because each time a request comes in to the server group that is part of a particular transaction, the same server in the group will be chosen. This prior art technique has been implemented in IBM's Component Broker 390 (CB/390)("Component Broker 390" and "CB/390" are trademarks of IBM Corp.) software product. It has also been implemented in IBM's CICSPlexSM ("CICSPlexSM" is a trademark of IBM Corp.) software product.

This prior art technique suffers from disadvantages. Particularly, as transactions are completed, there is no need to maintain mappings for such completed transactions in the mapping tables, otherwise, the tables will grow too large with information that is no longer useful. Thus, there is a need in the prior art to constantly maintain (i.e., "clean up") the mapping tables, thus requiring extra maintenance code within each server group.

SUMMARY OF THE INVENTION

According to one aspect, the present invention provides in a client/server data processing system where a client sends a work request to a server which includes a group of workload managed server data processing processes each of which is capable of performing the work request, a server data processing apparatus running a server data processing process, the apparatus has: a data storage unit storing mapping data which maps a particular server data processing process to each of a plurality of groups of workload managed server data processing processes; a means for receiving from a client a request for the identity of the mapped server data processing process corresponding to a particular group of workload managed server data processing processes, the particular group being specified in the request; a means for accessing the data storage unit to determine, for the particular group specified in the received request, the identity of the mapped server data processing process; and a means for returning the identity of the mapped server data processing process to the client; wherein the request received from the client is associated with an entity whose lifetime is coupled to the lifetime of the server data processing process.

According to a second aspect, the present invention provides a method for carrying out the functionality described above with respect to the first aspect.

According to a third aspect, the present invention provides a computer program product, stored on a computer readable storage medium, for, when run on a computer, carrying out the functionality described above with respect to the first aspect.

Therefore, the present invention maintains the mapping list of server group to server for a particular requesting entity, in a central location, rather than at each server group. When the requesting entity wishes to access a server group, the requesting entity first accesses this central location to determine, for a particular server group, which server in the server group should be used. This greatly reduces the amount of maintenance that must be carried out as entities become no longer relevant (e.g., as transactions complete).

The prior art has avoided using such centralized mapping because of the fact that the centralized mapping would become a single point of failure (i.e., if the centralized mapping goes down then the entire system that relies on it will be out of operation). However, a single point of failure is not considered a problem in the context of the present invention because the centralized mapping is maintained within a single process whose lifetime (i.e., lifecycle) is coupled to the lifecycle of the requesting entity.

For example, where the requesting entity is a transaction, the central location for keeping the mapping data is stored at the transaction's root (i.e., the top of the transaction tree), thus, when the transaction completes the transaction tree is automatically deleted. Placing the mapping list at the transaction's root also has the advantage of making it very easy for a requesting process within the transaction to find the central location because the requesting process need only trace back through the transaction tree until the root is reached. That is, the existing transaction tree structure can be used as the path from requesting process to mapping list central location.

BRIEF DESCRIPTION OF THE DRAWINGS

The present invention will be better understood by referring to the detailed description of the preferred embodiments discussed below in conjunction with the following drawing figures:

FIG. 4 shows the mapping table of FIG. 3 in more detail, according to a preferred embodiment of the present invention; and FIG. 5 is a flowchart showing the operational steps carried out by the server having the root coordinator, according to a preferred embodiment of the present invention.

DETAILED DESCRIPTION OF THE PREFERRED EMBODIMENTS

The preferred embodiment of the present invention is implemented according to the Common Object Request Broker (CORBA) Object Transaction Service (OTS) standard. Some background concerning this particular environment will now be provided.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

Figure 1:
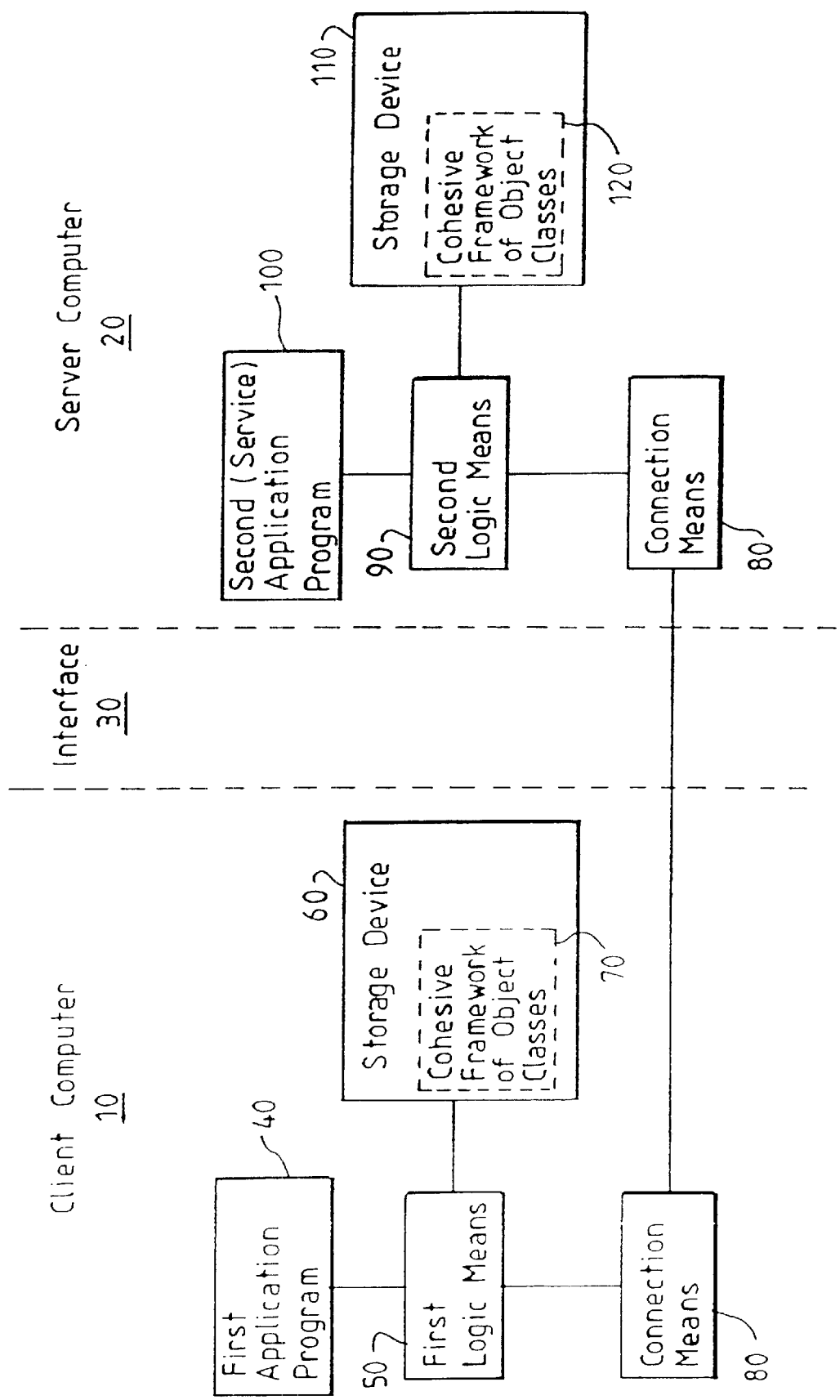
FIG. 1 is a block diagram useful in illustrating the object-oriented client/server environment of the preferred embodiment of the present invention.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a highpowered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker standard (called CORBA—the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. An implementation of the OMG's OTS is responsible for coordinating these distributed transactions.

An application running on a client process begins a transaction which may involve calling a plurality of different servers, each of which will initiate a server process to make changes to its local data according to the instructions contained in the transaction. The transaction finishes by either committing the transaction (and thus all servers finalize the changes to their local data) or aborting the transaction (and thus all servers "rollback" or ignore the changes to their local data made during the transaction). To communicate with the servers during the transaction (e.g., instructing them to either commit or abort their part in the transaction) one of the processes involved must maintain state data for the transaction. According to the OTS standard, this involves the process setting up a series of objects, one of which is a coordinator object which coordinates the transaction with respect to the various servers.

The main purpose of this coordinator object is to keep track of which server objects are involved in the transaction, so that when the transaction is finished, each server object involved in the transaction can be told to commit the changes made locally to the local database associated with that server object, in a single unified effort. This ensures that no server object makes a data change final without the other server objects which are also involved in the same transaction doing so. Thus, each server object which is to join a transaction must first register with the coordinator object so that the coordinator object will know of the server object's existence, its wish to join the transaction, and where to find the server object (e.g., which server machine the server object resides on) when it comes time to complete the transaction (where the coordinator object instructs all server objects to make the changes to their respective local data final).

A server object responsible for updating data (referred to hereinbelow as a resource object) gets involved in a transaction when another server object (or the original client object which started the transaction) sends a request to the resource object for the resource object to do some work. This latter request carries some information, called the transaction context, to inform the resource object that the request is part of a transaction. With CORBA version 2, the transaction context is built by the local CosTransactions::Coordinator object get_txcontext method. Once a resource object finds out that it is to be involved in a transaction, it then makes a registration request with the coordinator object.

Figure 2:
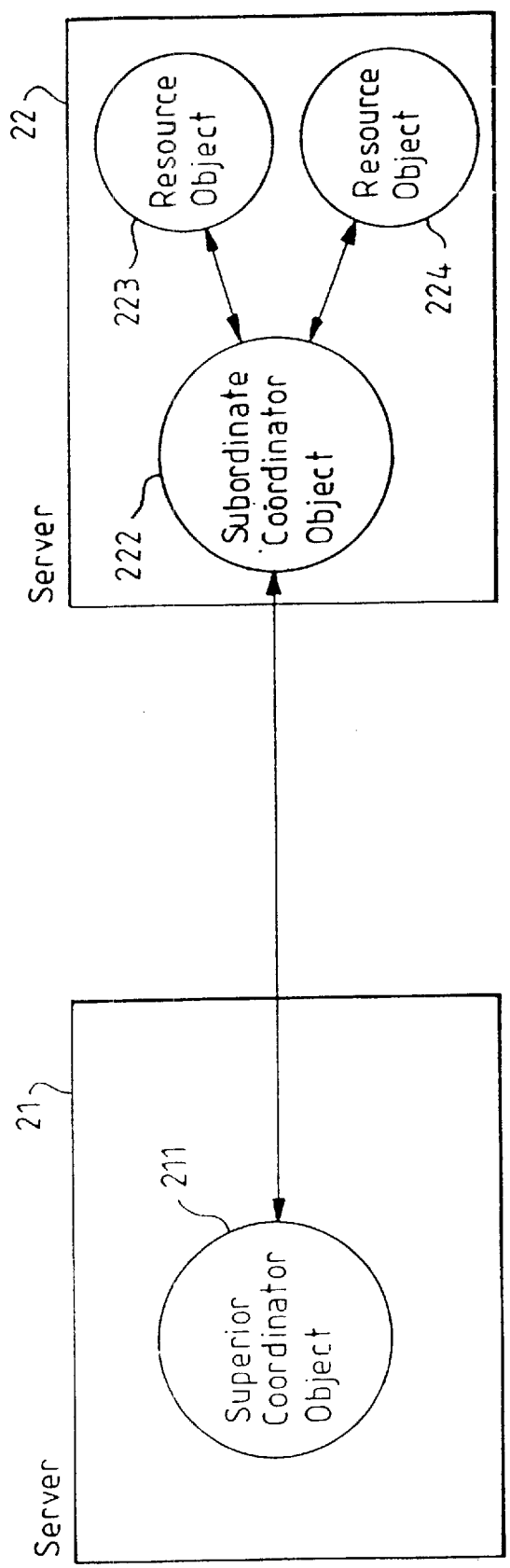
FIG. 2 is a block diagram useful in illustrating various components of the CORBA OTS, the environment of the preferred embodiment of the present invention.

When the resource object is located in a different operating system process from the coordinator object, it has been found to be useful to use a subordinate coordinator object (222 in FIG. 2) located in the same operating system process as the resource object (223 or 224). The main coordinator object is then called the "superior coordinator object" 211. During registration of a resource object 223 to the transaction, the subordinate coordinator 222 is set up locally inside the server machine 22 which houses the resource object 223 and the resource object 223 communicates directly with this subordinate coordinator object 222 when it makes a registration request. (It should be noted that while the term "server machine" is used here, the term "server process" could also be used, to thus indicate that the distributed server objects could, in fact, be located on the same server machine but on different operating system processes running on the server machine, and hereinafter the term "server" will be used to refer to both terms.) The subordinate coordinator 222, in turn, registers itself with the superior coordinator object 211 (which is located in another process possibly on another server machine as if it were a resource object).

The subordinate coordinator object 222 thus provides a representation of the existence of the transaction within the server housing the resource object. Instead of communicating directly with the superior coordinator object 211, the resource objects 223 and 224 first communicate with their local subordinate coordinator object 222 which in turn communicates with the superior coordinator object. This greatly reduces the number of cross-operating-system-process calls.

Figure 3:
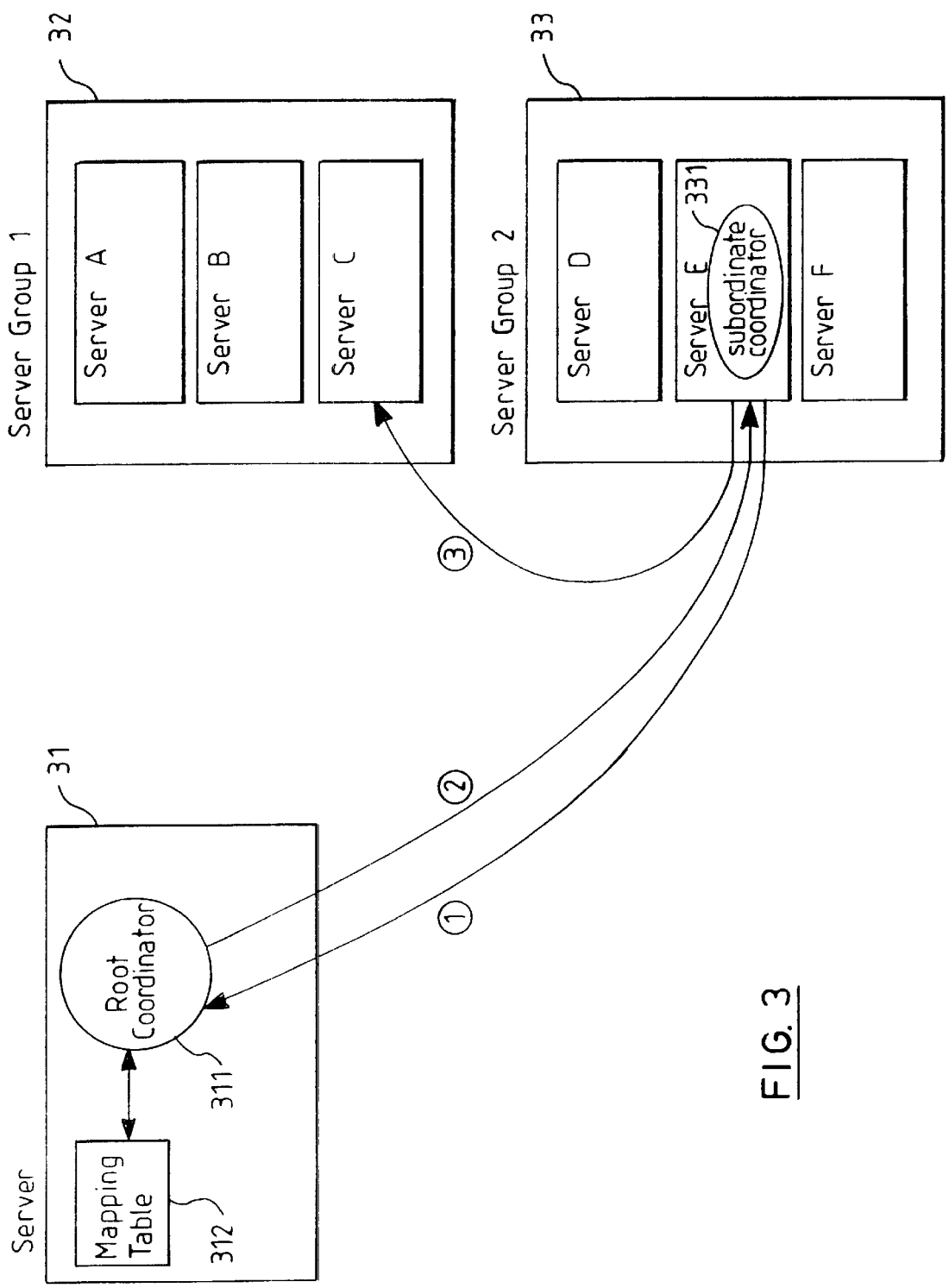
FIG. 3 is a block diagram showing the various data processing processes of an example used to illustrate a preferred embodiment of the present invention.

In FIG. 3 a server process 31 contains the root coordinator 311 (also known as the superior coordinator) as well as the mapping table 312, which is stored in system memory. A first group 32 of servers (servers A, B and C) is next provided and has the identifier (name) "server group 1", with each server running in its own process. Likewise, a second group 33 of servers (servers D, E and F) is next provided and has the identifier "server group 2".

There is a mapping table 312 maintained in the same server process as the root coordinator 311 for each transaction that is running. For a particular transaction, the mapping table 312 (as shown in more detail in FIG. 4) lists an identifier of the server group (e.g., server group 1) in the first column 3121 alongside the identity of the corresponding mapped server (e.g., server C) in the second column 3122. Thus, the mapping table keeps track of the fact that whenever a request that is part of the transaction for which the table is set up wishes to access one of the servers of server group 1, then the server that should be accessed is server C. Likewise, whenever a request that is part of the transaction for which the table is set up wishes to access one of the servers of server group 2, then the server that should be accessed is server E. The server 31 maintains the mapping table 312 as part of its CosTransactions::Coordinator information, for example, as an instance of a class called "AffinityMappings". When the root coordinator's mapping table 312 does not contain an entry for a requested server group, the root coordinator selects one of the servers in the server group (e.g., arbitrarily, or based on some criteria) and the corresponding new mapping entry is added to the root's mapping table 312.

The operational steps carried out by the server 31 are illustrated in the flowchart of FIG. 5 and will be described below.

Let us assume that as part of a running transaction, server E in server group 2 needs to send a unit of work request to one of the servers of server group 1. Server E includes a subordinate coordinator 331 which keeps track of which resources local to server E are involved in the running transaction. Server E, according to the preferred embodiment of the present invention, sends a cross process request (arrow with encircled numeral 1 in FIG. 3) to the root coordinator 311 of server 31 to request that the server 31 inform the server E of which server (A, B or C) of server group 1 the server E should use to send the unit of work request to, as part of the running transaction. That is, server E knows that it must send a work request to one of the servers of server group 1 but server E does not know which of the three servers (A, B or C) to send the request to. Thus, to learn the identity of the server (A, B or C) which should be selected, server E sends the request (circled numeral 1) to server 31.

It should be noted that root coordinator 311 is at the top of the transaction tree that includes subordinate coordinator 331 in a lower (subordinate) position as compared to root coordinator 311. Thus, subordinate coordinator 331 can easily locate the server process 31 that should be the target of the request (circled numeral 1) because subordinate coordinator 331 need only follow the transactional tree up to the top coordinator in the tree (root coordinator 311) which is located in server 31.

Upon receiving (step 51 in FIG. 5) the request (encircled numeral 1) from server E, server 31 accesses from system memory the mapping table 312 of FIG. 4. The received request from server E includes an indication of the identity of the particular server group that server E is interested in (in this case, it is server group 1). Server 31 uses this server group identity to access (step 52) the mapping table 312 and to find from the table that for server group 1 in column 3121 server C is located in adjacent column 3122. That is, server group 1 maps to server C, according to mapping table 312.

Server 31 then sends (step 53) the identity of server C back to server E (arrow with encircled numeral 2). This informs server E that server C should be contacted by server E. Server E then sends the transactional request (arrow with encircled numeral 3) to server C.

This maintains transactional affinity because for this particular transaction, whenever any of the servers of server group 1 is to be accessed, server C is always selected.

In order to improve performance, the mapping of server group 1 to server C could be cached with the subordinate coordinator 331 in server E. A subordinate coordinator thus requests mapping information from its superior if such mapping information is not cached locally. The request for mapping information is therefore recursively propagated up the transaction tree until the information is acquired (i.e. a subordinate does not necessarily always need to query the root to get affinity mapping information—it may be stored locally or at an intermediate node in the transaction tree).

It should be noted that a very simple transaction has been used in FIG. 3 for ease of illustration of the preferred embodiment of the invention. In practice, a much more complex transaction would be used, where, for example, subordinate coordinator 331 has several other layers of subordinate coordinators beneath subordinate coordinator 331. In such a complex transaction, a subordinate coordinator far removed from the root coordinator 311 in the transaction tree which needs to contact a server group as part of the transaction need only trace back through the transaction tree all the way up to the root coordinator 311 (through the subordinate coordinator 331) in order to determine the location of the server process which includes the mapping table.

It should also be noted that although there is a single point of failure in that the mapping table is located in a single (central) position, the mapping table 312 is only relevant to the particular transaction for which it has been set up and the root coordinator 311 which coordinates access to the mapping table 312 has the same lifecycle as the transaction itself (the root coordinator is deleted when the transaction completes). Thus, the fact that there is a single point of failure does not cause too much of a problem in this invention.

While the preferred embodiment has been discussed in the context of a transaction being the entity for which the mapping table is created, the present invention is not so limited. For example, a client can also be this entity. That is, the mapping table can be set up on behalf of a particular client and include the server group/server mapping which a particular client should use each time a client wishes to access a server group. The lifecycle of the server process which includes the mapping table would be coupled to the lifecycle of the client in some predetermined way to avoid the single point of failure problem.

We claim:

1. In a client/server data processing system where a client sends a work request to a server which includes a group of workload managed server data processing processes each of which is capable of performing the work request, a server data processing apparatus running a server data processing process, the apparatus comprising:

a data storage unit storing mapping data which maps a particular server data processing process to each of a plurality of groups of workload managed server data processing processes;

means for receiving from a client a request for the identity of the mapped server data processing process corresponding to a particular group of workload managed server data processing processes, the particular group being specified in the request;

means for accessing the data storage unit to determine, for the particular group specified in the received request, the identity of the mapped server data processing process; and means for returning the identity of the mapped server data processing process to the client;

wherein the request received from the client is associated with an entity whose lifetime is coupled to the lifetime of the server data processing process, wherein said entity is a transaction, and the request received from the client is part of the transaction, and wherein the server data processing process is located at the root of a transaction tree representing the transaction.

2. The apparatus of claim 1 wherein the request received from the client has reached the server data processing process by traversing the transaction tree representing the transaction.

3. The apparatus of claim 1 wherein the server data processing apparatus includes an implementation of the Common Object Request Broker Object Transaction Service architecture.

4. The apparatus of claim 3 wherein the server data processing process is located at the root coordinator of a transaction tree representing the transaction.

5. The apparatus of claim 1 wherein the client which issued the request received by the server data processing process includes one of said plurality of server groups, and the particular group specified in the request is another of said plurality of server groups.

6. In a client/server data processing system where a client sends a work request to a server which includes a group of workload managed server data processing processes each of which is capable of performing the work request, a server data processing method carried out via a server data processing apparatus, the apparatus running a server data processing process, the apparatus comprising a data storage unit storing mapping data which maps a particular server data processing process to each of a plurality of groups of workload managed server data processing processes, the method comprising steps of:

receiving from a client a request for the identity of the mapped server data processing process corresponding to a particular group of workload managed server data processing processes, the particular group being specified in the request;

accessing the data storage unit to determine, for the particular group specified in the received request, the identity of the mapped server data processing process; and returning the identity of the mapped server data processing process to the client;

wherein the request received from the client is associated with an entity whose lifetime is coupled to the lifetime of the server data processing process, wherein said entity is a transaction, and the request received from the client is part of the transaction, and wherein the server data processing process is located at the root of a transaction tree representing the transaction.

7. The method of claim 6 wherein the request received from the client has reached the server data processing process by traversing the transaction tree representing the transaction.

8. The method of claim 6 wherein the server data processing apparatus includes an implementation of the Common Object Request Broker Object Transaction Service architecture.

9. The method of claim 8 wherein the server data processing process is located at the root coordinator of a transaction tree representing the transaction.

10. The method of claim 6 wherein the client which issued the request received by the server data processing process includes one of said plurality of server groups, and the particular group specified in the request is another of said plurality of server groups.

11. A computer program product, stored on a computer-readable storage medium, tangibly embodying a program of instructions executable by the computer to perform the method steps of claim 6.

* * * * *